United States Patent [19]

Liebel et al.

[11] 4,349,303

[45] Sep. 14, 1982

[54] LOAD SPACER

[75] Inventors: Henry L. Liebel; Martin Krier, both of Cincinnati, Ohio

[73] Assignee: Angleboard Inc., Cincinnati, Ohio

[21] Appl. No.: 75,085

[22] Filed: Sep. 13, 1979

[51] Int. Cl.³ .............................................. B61D 45/00
[52] U.S. Cl. ...................................................... 410/154
[58] Field of Search ......................................... 410/154

[56] References Cited

U.S. PATENT DOCUMENTS

| | | | |
|---|---|---|---|
| 3,581,675 | 1/1971 | Kauffman | 410/154 |
| 3,593,671 | 7/1971 | Bramlett | 410/154 |
| 3,618,535 | 11/1971 | Hees | 410/154 |
| 3,823,675 | 7/1974 | Farley | 410/154 |
| 3,842,757 | 10/1974 | Kinnune, Jr. | 410/154 |
| 3,862,607 | 1/1975 | Loudin | 410/154 |

Primary Examiner—Richard A. Bertsch
Attorney, Agent, or Firm—Wood, Herron & Evans

[57] ABSTRACT

A load spacer is disclosed having an improved suspension system for suspending the load spacer between containers or articles in a railway boxcar or other freight shipping vehicle or container to prevent shifting of the load. The load spacer is a collapsible honeycomb structure and includes spaced, elongated, rigid suspension members which are woven through the upper two layers of the structure. The ends of the suspension members project laterally past the planar sides of the structure and are adapted to rest on the tops of articles of freight on opposite sides of the space filled by the load spacer. The suspension members support the spacer from above over a relatively wide area and are held in position by a relatively high frictional force to provide a strong, reliable suspension system.

11 Claims, 6 Drawing Figures

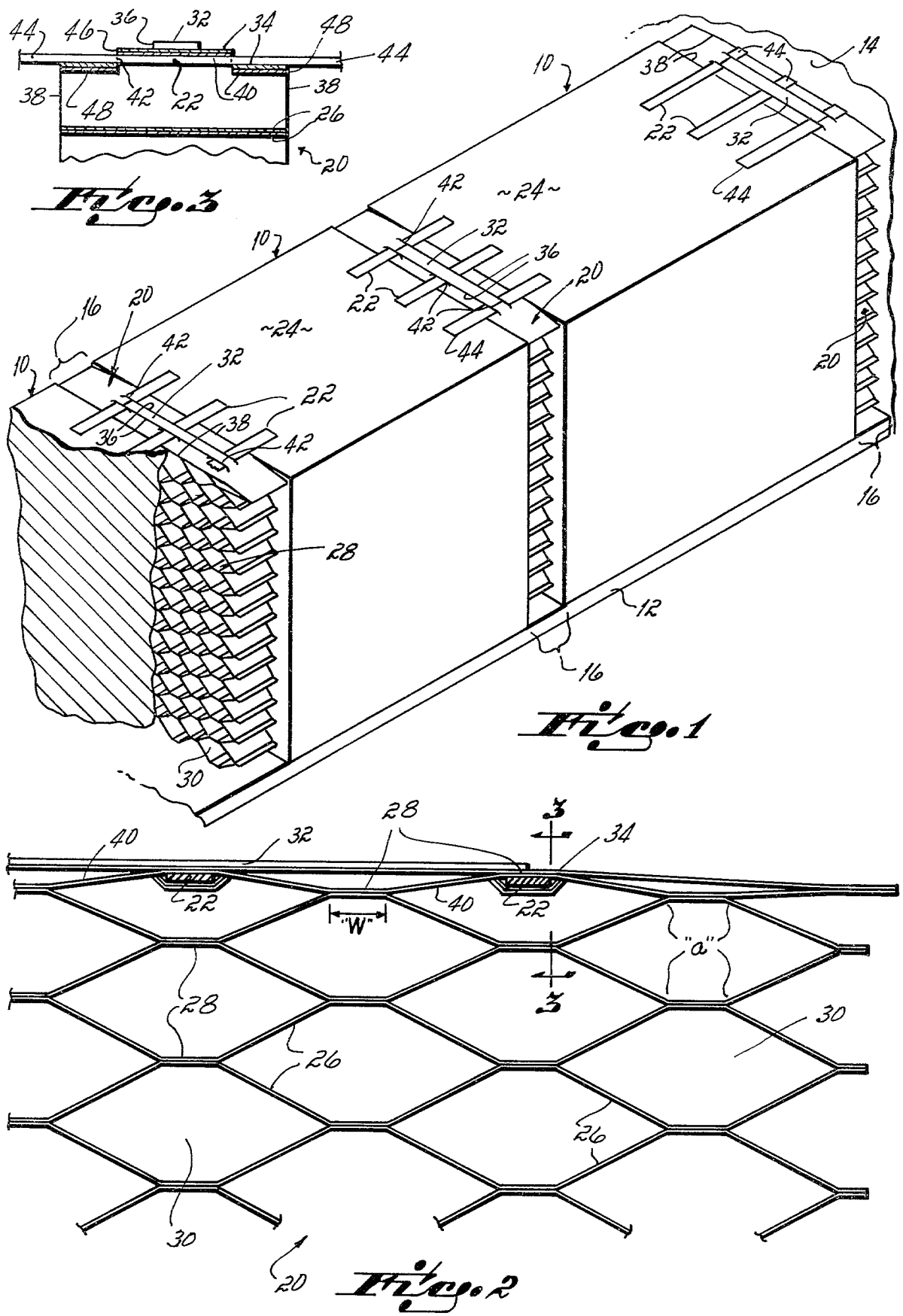

LOAD SPACER

BACKGROUND OF THE INVENTION

This invention relates to a load spacer for use between adjacent articles or containers of freight which may be collapsed to a compact package for shipment or storage but can be readily expanded for use. More particularly, this invention relates to an improved method for suspending the load spacer between adjacent articles of freight from the tops thereof.

In the loading of a freight container such as a railroad boxcar or other freight shipping vehicle or container, it frequently happens that the loads placed therein do not completely fill up the available storage space. Thus, there are left one or more vertical spaces between closely spaced adjacent unit loads of goods or between the loads and the walls of the shipping container. These spaces should be filled in order to prevent side shifting of the loads during transit which could cause damage to the load.

Prior to the present invention, various forms of load spacers or void fillers have been proposed for filling these planar spaces. One particular form of load spacer is a collapsible, honeycomb structure in which a stack of rectangular strips of sheet material, for example, corrugated paperboard, are glued to adjacent strips at spaced and staggered positions such that when expanded the strips define a honeycomb structure having a plurality of cells. These load spacers typically include one or more elongated, relatively rigid suspension members extending transversely of the honeycomb structure to permit the spacer to be hung for use between a pair of spaced apart articles of freight. The honeycomb structure then expands downwardly between the articles under its own weight or it is pulled downwardly to the bottom of the stack. When no longer needed, the load spacer may then be removed and stored in a collapsed condition for later use. Patents representative of this state of the art include U.S. Pat. Nos. 3,862,607; 3,842,757; 3,823,675; 3,618,535; and 3,593,671.

Prior workers have addressed themselves to the problem of suspending the load spacer between the articles of freight. For example, in U.S. Pat. Nos. 3,618,535 and 3,593,671, it is suggested that wooden slats be riveted to the upper or top strip of sheet material so that they may be swung to lie either between the lateral confines of the spacer or transversely of the structure. In the embodiments illustrated in these patents, two rivets support the entire weight of the spacer. A typical spacer might weigh as much as 15 pounds, and these rivets have a tendency to snap during use allowing the spacer to drop. Moreover, the suspension members, although pivotable about the rivets, cannot be moved in a direction transverse to the sides of the spacer. Thus, it is impossible to suspend the spacer by cantilevering one end of the suspension members from the tops of the load of freight as would be required in suspending the spacer between the freight and the end or side walls of the freight container.

Another form of suspension system, illustrated in U.S. Pat. No. 3,842,757, involves the use of two pieces of wood, such as pieces of wood lath, which are inserted through the honeycomb cells beneath the top strip of sheet material. In this construction, the suspension member is separate from the load spacer and requires the user to actually insert the member through the cell. The wood lath also has a tendency to vibrate out of position permitting the load spacer to collapse. Because the suspension members are not attached to the load spacer some means, e.g., a tie band, also must be provided to secure them to the spacer during shipment and storage.

Other suspension systems are illustrated in U.S. Pat. No. 3,862,607 and 3,823,675, wherein the suspension system includes a gimbal attached to the top sheet of the load spacer, for example, by means of pins or staples. Again, in these systems, the attaching member supports the entire weight of the spacer and tends to pull or snap out permitting the spacer to drop.

SUMMARY OF THE INVENTION

An objective of the present invention has been to provide an improved suspension system for a load spacer which is simple in construction yet strong and which possesses improved reliability thereby minimizing the possibility that the load spacer will be dislodged in use.

The load spacer of the present invention includes an expandable and contractible honeycomb structure adapted to be suspended from above with the weight of the honeycomb structure tending to elongate it in a vertical direction between adjacent loads. The load spacer is constructed of a stack of rectangular strips of sheet material which are secured to adjacent strips at spaced and staggered positions such that the strips define a honeycomb structure having a plurality of cells when expanded. The top strip includes pairs of transversely spaced slots extending in a direction generally parallel to the long sides of the strip. Elongated, relatively rigid suspension members such as pieces of wood lath are woven through the slots, the slots being slightly longer than the suspension members are wide. The suspension members extend transversely across the top of the structure with the ends thereof projecting laterally beyond the side edges of the structure to permit the spacer to be hung between a pair of spaced apart loads.

The slots are preferably die cut through the upper two sheets at the glue lines joining the sheets and the suspension members woven therethrough such that a center portion of the two top sheets lies above the suspension members and the side portions of the two sheets lie below the members. The suspension members thus support the load spacer over a relatively wide area and are reliably held in place against transverse movement by the frictional force of the entire surface area of the top sheets bearing against the members.

In one preferred form of the invention, the top sheet has secured to it an elongated, relatively rigid wood strip which lies between the transversely spaced slots. The suspension members are woven through the two layers of sheet material and under the elongated wood strip. The wood strip provides increased thickness of material and a rigid bearing member for supporting the load spacer from above and prevents the suspension members from vibrating together in use.

It has been another objective of this invention to provide load spacers which may be compactly grouped and shipped to the user on a pallet with the suspension members preassembled in each spacer but positioned so that the ends of the members do not extend beyond the sides of the pallet. The suspension members are thus protected during shipment, but do not require insertion by the user. To this end, the suspension members can be moved transversely in their slots without being removed from their woven position through the slots so that a number of load spacers in the collapsed condition may be placed side-by-side with the ends of the suspension members overlapping the adjacent spacers but not extending beyond the side edges of the pallet. Thus, the load spacer of the present invention may be placed in a collapsed condition on a pallet with the suspension members assembled in the spacer with no end of any member projecting beyond the pallet where it could otherwise be broken off.

Another disadvantage of prior art load spacers is that they are very difficult to fully expand in a vertical direction. That is, the sheet material used to make load spacers is typically relatively stiff. When the spacers are suspended from the top of the load, the weight of the structure tends to elongate only a narrow upper portion of the spacer in a vertical direction. Therefore, it is necessary for the user to physically expand the spacer so that it fills the entire height of the void between loads.

Another objective of the invention has been to provide a load spacer which drops all the way down between the adjacent loads when the user puts it in place. To this end, the load spacer of the present invention is precreased to facilitate opening of the cells. This is accomplished by overstretching the load spacer as part of the manufacturing operation. This operation causes creases to form in the relatively stiff sheet material adjacent the glue lines securing the adjacent sheets. Thus, when the load spacer is put in place, considerably less force is required to open the cells and the weight of the spacer is sufficient to cause the bottom to drop substantially all the way down to the floor.

These and other objectives of the invention will become more readily apparent from the following detailed description of the invention taken in conjunction with the accompanying drawings.

BRIEF DESCRIPTION OF THE DRAWINGS

FIG. 1 is a perspective view partly in section of a typical load arrangement illustrating the application of the load spacer of the present invention;

FIG. 2 is a fragmentary side view of the load spacer shown in FIG. 1;

FIG. 3 is a cross-sectional view taken along line 3—3 of FIG. 2;

DETAILED DESCRIPTION OF THE INVENTION

Figure 4:
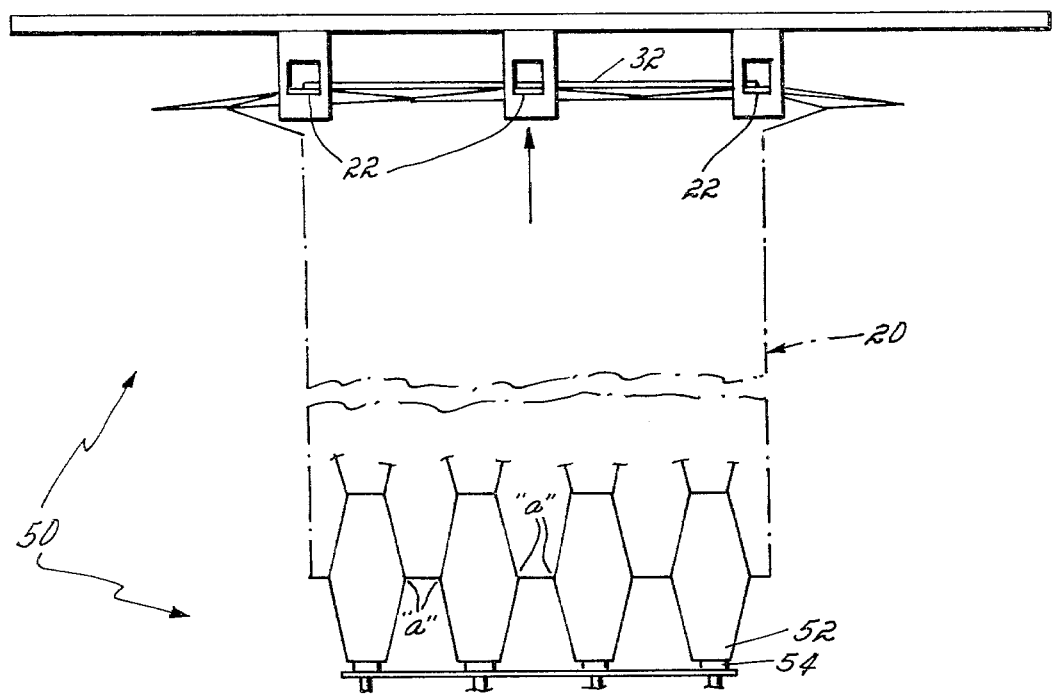
FIG. 4 is a side elevation view illustrating the apparatus for overstretching the load spacer.

Referring now to FIG. 1, in a typical load arrangement for shipping unit containers or articles of freight, stacks of articles of freight 10 are placed on the floor 12 of a freight shipping vehicle such as a railway boxcar having vertical end and side walls, a portion of one wall being designated in FIG. 1 by the number 14. The stacks 10 are separated from each other and from the walls of the shipping container by generally planar spaces 16. The load spacer 20 is generally an expandable and contractible honeycomb structure which is positioned between the spaced stacks of articles of freight 10 to prevent sideways shifting of the load. As shown in FIG. 1, the load spacers 20 are suspended from above by suspension members 22 resting on the top 24 of the adjacent loads 10 and substantially fill the spaces 16 between loads. As is well known, such honeycomb structures are very strong in a direction transverse to the planar sides thereof.

Referring now in addition to FIGS. 2 and 3, the load spacer 20 is formed from a stack of rectangular strips of sheet material 26 which are secured to adjacent strips at spaced and staggered intervals, as at 28 as, for example, by gluing the strips together. The sheet material is preferably chipboard but may be other material, for example paperboard either corrugated or uncorrugated. The width of the glue line is indicated by the designation "w" in FIG. 2. When the stack of strips of sheet material is expanded, the sheet material 26 therefore defines a vertical and horizontal array of adjacent cells 30 having a generally honeycomb cellular configuration. The number and size of strips used in the spacer is a matter of choice. Typically, a sufficient number of strips are used to permit the spacer to expand to fill a void six to eight feet high. A convenient width is about eight inches and a convenient length is about 48 inches.

Figure 6:
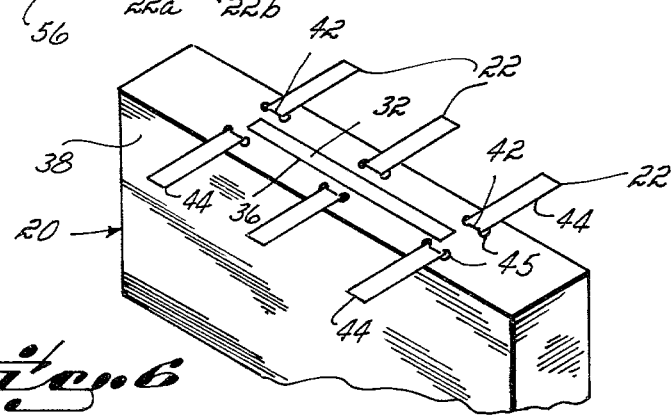
FIG. 6 is a perspective view illustrating the load spacer in its collapsed condition.

An elongated, relatively rigid member 32 as, for example, a piece of wood lath, is secured to the top sheet 34 of the spacer 20 by gluing. The long edges 36 of the lath 32 are generally aligned with the long sides 38 of the spacer 20, and the lath 32 is located generally equidistant from the sides 38. The top two sheets 34 and 40 of the honeycomb structure 20 are slit as, for example, by die cutting, to form a series of spaced pairs of parallel slots 42. The pairs of slots 42 preferably overlie the glue lines 28 between the adjacent strips 34 and 40. These pairs of slots 42 are spaced along the length of the top sheet, e.g., on 12 inch centers, with the elongated member 32 lying between the parallel slots 42. Elongated, rigid suspension members 22, which also may be strips of wood lath, are woven through the slots 42, as shown in FIG. 3, such that a portion of the sheets 34, 40 lies above and below the members 22. End portions 44 of the members 22 extend laterally past the side edges 38 of the sheets 26 to provide bearing surfaces for supporting the load spacer 20 on the loads 10. As best shown in FIG. 6, small circular openings 45 are die cut through the sheets 34 and 40 at the ends of each slot 42 to prevent tearing of the sheet material beyond the ends of the slots. The length of the slots 42 is slightly greater than the width of the members 22.

By virtue of the suspension members 22 being woven over and under the sheets 34 and 40 at the glue line 28, a portion 46 of double thickness of sheet material lies above the members 22 at the center of the spacer 20 and a portion 48 of double thickness of sheet material lies below the members 22 on the sides of the spacer 20. The double thickness of sheet material eliminates the need for any additional reinforcing strips. The suspension members 22 are held in place by the frictional force between the mating surfaces of the members 22 and the sheet material 34, 40 across the width of the spacer 20. Moreover, the center portion 46 is relatively wide, e.g., having a width equaling about one-half of the width of the spacer 20. As a result, the suspension members 22 support the weight of the load spacer 20 over the relatively large area of portion 46.

Because the suspension members 22 are tightly bound in the load spacer 20 by virtue of the members 22 being woven through the upper two sheets 34 and 40 of the spacer 20, the members do not move significantly during use. However, the user by applying suitable force to either end of the suspension members can slide the members in a transverse direction. Referring again to FIG. 1, this may be desired, for example, to cantilever the load spacer 20 from the end load adjacent the wall of the freight container as shown at the extreme right of FIG. 1. In this position, the suspension members 22 are moved such that the ends 44 of the members 22 adjacent the wall 14 are flush with the side 38 of the spacer 20.

In applying the spacer 20, the freight is usually loaded or placed in position, for example, on a single pallet or the like moved to position in the container by a forklift truck. After the stack is in position, the load spacer 20 is placed at the top of the load 10 with the projecting ends 44 of the suspension members 22 engaging the top surface 24 of the load 10. The load spacer is then allowed to drop down to fill the area 16 between the loads 10. The honeycomb structure is self-expanding and is held in position by gravity.

Referring now to FIG. 4, in the manufacture of the honeycomb structure, the stacks of rectangular strips of sheet material are glued together at spaced and staggered intervals as described above, and the two top sheets are die cut to receive the suspension members 22 in woven fashion therethrough. Thereafter, the projecting ends 44 of the members 22 are fixed in a vertically movable jig 50. At the other end or bottom 52 of the spacer 20, a series of suction cups 54 are applied against the outer surface of the sheet material to hold the bottom 52 in fixed position. The jig 50 is then moved upwardly to expand the honeycomb. The honeycomb structure is overexpanded by this method about 20 to 25% of its normal expanded height. That is, in a spacer designed for use in an eight foot high space, the structure is overexpanded by about two feet, i.e., to a ten foot height. This causes creases to form in the sheet material along the edges of the glue line 28 as indicated by "a" in FIGS. 2 and 4. Thus, the honeycomb structure of the present invention is actually prestretched and precreased so that it will readily expand when positioned between loads and dropped.

Figure 5:
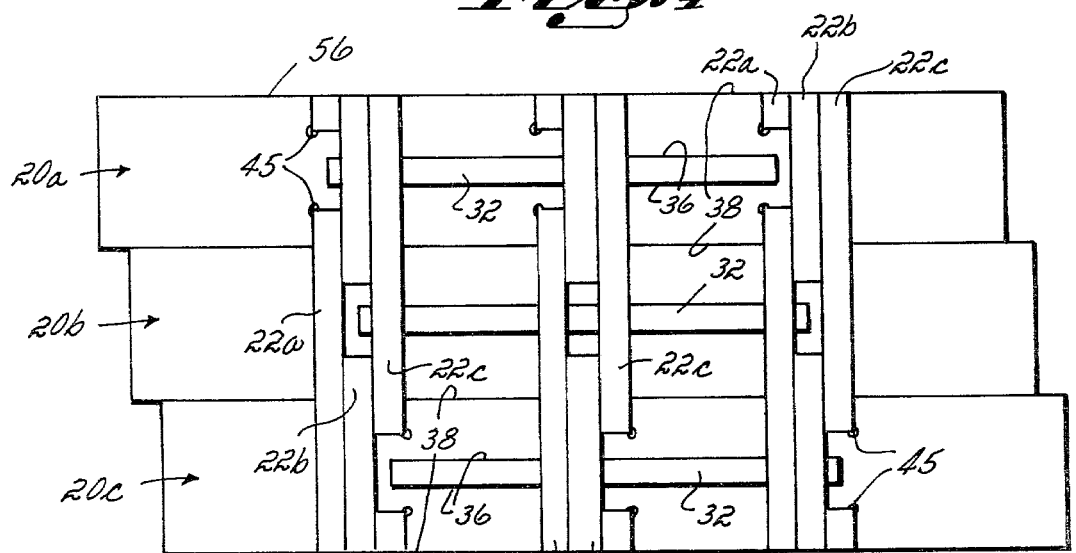
FIG. 5 is a top plan view of a plurality of load spacers placed side-by-side by shipping or storage.

When collapsed for storage or shipment, in the condition shown in FIG. 6, a number of load spacers 20a, b, c may be placed side-by-side (FIG. 5), for example, on a pallet, thus minimizing the space occupied by the collapsed structures. In such position, the suspension members 22 are moved transversely so that no end projects beyond the outer side edges 56 of the outer-lying members 20a and 20c. That is, for example, referring to FIG. 5, the suspension members 22a of spacer 20a are moved in a direction such that they have the bulk of their length overlying spacers 20b and 20c. Members 22c of spacer 20c are likewise moved to overlie spacers 20b and 20a. Members 22b of the center spacer 22b overlie spacers 20a and 20c. Thus, the spacers may be placed side-by-side with the suspension members 22a, b, c thereof also lying in side-by-side relation. This minimizes the space occupied by the collapsed structure and prevents the ends of the suspension members from being snapped off which could otherwise occur if they extended beyond the side edges 56 of the load spacers.

When it is desired to use one of the spacers 20a or 20c, the user merely moves the members 22a or 22c, respectively, transversely to a desired position. This position may be one where equal lengths project beyond the side edges as shown at the center and left in FIG. 1 or where one end 44 is flush with a side edge 38 as shown at the right in FIG. 1 to support the load spacer between a wall 14 of the container and the load 10.

In any event, the suspension members 22 are always preassembled in the spacer 20. This eliminates the time and labor which would otherwise be required in using the spacer.

Although our invention has been described in terms of certain preferred embodiments, it will be recognized that other forms may be adopted by those skilled in the art.

We claim:

1. A load spacer adapted to be suspended from the top of adjacent laterally spaced loads comprising
    a cellular structure having a top and generally planar sides, said top having a pair of spaced slots therein, and
    an elongated, relatively rigid suspension member inserted into and through said slots across said top in a weave pattern such that portions of said top lie on either side of said suspension member with at least one end of said member projecting laterally beyond a side of said structure,
    said portions lying on either side of said suspension member being offset by the thickness of said suspension member such that said suspension member is held in place by the frictional force between the mating surfaces of said suspension member and said portions of said top and the binding force of said offset.

2. A load spacer adapted to be removably placed between adjacent laterally spaced loads and suspended from the top thereof comprising
    an expandable-contractible cellular structure including a stack of interconnected strips of rectangular sheet material defining a plurality of cells when expanded, the top strip of said structure including at least a pair of spaced slots generally aligned with the long edges of said strip, and
    an elongated, substantially rigid suspension member woven through said slots transversely across said top strip such that portions of said top strip lie on either side of said suspension member, at least one end of said suspension member projecting laterally beyond the opposite side edges of said structure and being adapted to rest on the top of a spaced load to suspend the spacer therefrom,
    said portions lying on either side of said suspension member being offset by the thickness of said suspension member such that said suspension member is held in place by the frictional force between the mating surfaces of said suspension member and said portions of said top and the binding force of said offset.

3. The load spacer of claim 2 wherein said strips are interconnected by glue lines extending transverse to the long edges of said top strip, and said pair of spaced slots extend through a glue line in the top strip and the strip secured thereto.

4. The load spacer of claim 2 wherein said slots are located at the interconnection of the top two strips of sheet material and extend through both of said strips, and wherein a portion of both said strips lies on either side of said member.

5. The load spacer of claim 4 wherein the width of that portion lying above said member is about one-half the width of said strips.

6. The load spacer of claim 4 wherein said strips are interconnected by glue lines and wherein said spacer includes a plurality of pairs of slots spaced along the length of said strip material at said glue lines.

7. The load spacer of claim 2 further including an elongated, substantially rigid member secured to the top of said spacer between said slots.

8. The load spacer of claim 7 wherein said suspension member underlies at least a portion of said member secured to the top of said spacer.

9. An expandable and contractible cellular structure suspendible from above comprising a stack of rectangular strips of sheet material, the strips of sheet material being secured to adjacent strips at spaced and staggered positions such that the strips define a structure having a plurality of cells when expanded, the top strip including a plurality of pairs of spaced slots extending generally parallel to the long sides of said strip, an elongated, substantially rigid member fixed to the top strip of said cellular structure between said slots, an elongated, substantially rigid suspension member passing through each pair of said slots and extending transversely across said top sheet with its ends projecting laterally beyond the side edges of said strips, said projecting ends being adapted to engage spaced articles to support said structure between said articles, said suspension members passing through said slots such that a center portion of said top strip lies on one side of said member and the side portions lie on the other side thereof, said portions lying on either side of said suspension member being offset by the thickness of said suspension member such that said suspension member is held in place by the frictional force between the mating surfaces of said suspension member and said portions of said top and the binding force of said offset.

10. The cellular structure of claim 9 wherein said strips of sheet material are joined at glue lines and wherein each pair of spaced slots extends through at least two strips of sheet material at said glue line.

11. The cellular structure of claim 9 wherein said strips are interconnected by glue lines and are precreased at the edges of said glue lines.

* * * * *